United States Patent [19]

Mouri et al.

[11] Patent Number: 4,561,694
[45] Date of Patent: Dec. 31, 1985

[54] RECLINING ADJUSTER FOR CAR SEAT

[75] Inventors: Hideto Mouri, Ebina; Nobuhiro Inoue, Akishima, both of Japan

[73] Assignee: Tachikawa Spring Co., Ltd., Akishima, Japan

[21] Appl. No.: 563,332

[22] Filed: Dec. 20, 1983

[30] Foreign Application Priority Data

Dec. 21, 1982 [JP] Japan ............... 57-194346[U]

[51] Int. Cl.$^4$ ............... A47C 1/024; B60N 1/06
[52] U.S. Cl. ............... 297/379; 297/355; 297/370
[58] Field of Search ........ 297/354, 355, 357, 370–372, 297/378, 379; 296/65 R; 292/213, 214, 225, 235, 341.17

[56] References Cited

U.S. PATENT DOCUMENTS

| | | | |
|---|---|---|---|
| 840,348 | 1/1907 | Leonard | 397/370 X |
| 2,146,520 | 2/1939 | Zimtbaum | 297/357 |
| 2,855,026 | 10/1958 | Simons et al. | 297/355 X |
| 3,322,461 | 5/1967 | Goldman et al. | 297/379 |
| 3,973,799 | 10/1976 | Berg | 296/65 R X |
| 4,067,611 | 1/1978 | Kurozu et al. | 297/355 |
| 4,475,763 | 10/1984 | Hamatani et al. | 297/378 X |

FOREIGN PATENT DOCUMENTS 2950314  6/1981  Fed. Rep. of Germany ...... 297/354

*Primary Examiner*—William E. Lyddane
*Assistant Examiner*—Peter R. Brown
*Attorney, Agent, or Firm*—David A. Jackson; Daniel H. Bobis

[57] ABSTRACT

A novel reclining adjuster for a car seat is disclosed which is provided between the seat back and the side wall of the car body. A lock pin in engagement with a striker is positioned at the lower part of the seat back. The striker can be rotated by operating a knob to a certain extent so that the locked state of the seat back may be released.

6 Claims, 11 Drawing Figures

FIG. 9
FIG. 10
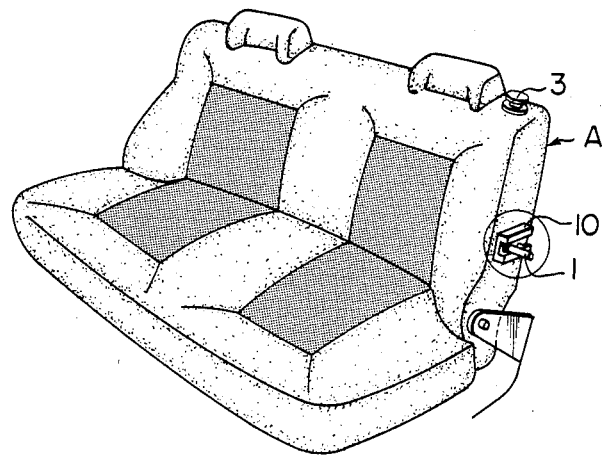
FIG. 11
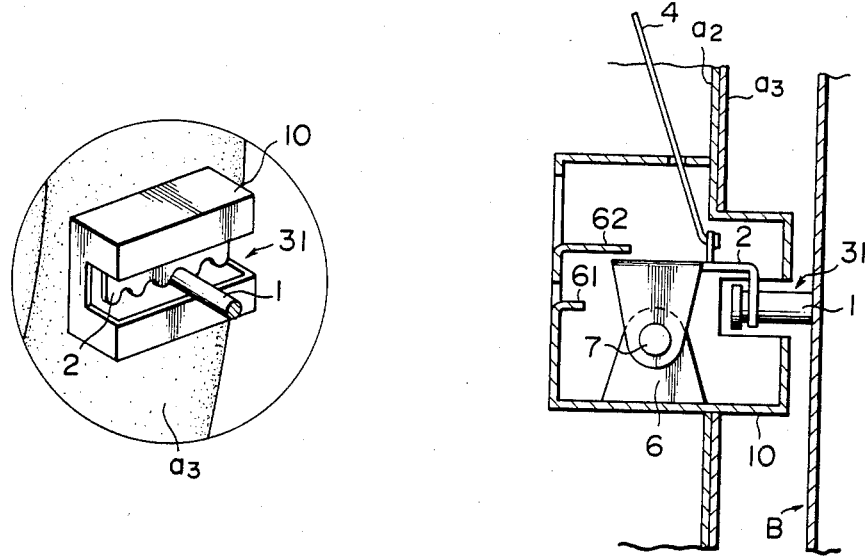

4,561,694

RECLINING ADJUSTER FOR CAR SEAT

BACKGROUND OF THE INVENTION

1. Field of the Invention

The present invention relates to a reclining adjuster for a car seat, and particularly to an reclining angle adjusting apparatus provided between a seat back and a side wall of a car body.

2. Description of the Prior Art

Conventionally, a reclining adjuster of the kind mentioned above has a structure as shown in FIG. 1, wherein a striker $2a$ is fixed to the side wall at the position facing a seat side, and wherein a lock pin $1a$ is provided in the seat for releasable engagement with the striker $2a$ under the operation of an operation knob $3a$.

The adjuster of the prior art, is advantageous in that it can be provided with such a striker $2a$ as can make the seat incline to a wide extent and to a desired angle. The prior art adjuster, however, has defects due to the fact that the striker $2a$ is exposed outside the seat, that it spoils the beauty in the car, and it catches dresses of the seated person.

SUMMARY OF THE INVENTION

The object of the invention is to provide a novel reclining adjuster which is free from drawbacks in connection with prior art apparatus where a striker is mounted to the side wall of a car body.

Another object of the invention is to provide a reclining adjuster by which the seat can be inclined to a wide extent and to a desired angle. For achieving this object, a striker is positioned at the lower part of the seat, i.e., at the position near to the pivot center of the seat. With the arrangement as such a striker which is smaller than those conventionally used, enables the seat to incline to a wide extent.

A further object of the invention is to provide a striker which is not exposed out of the seat. For achieving this object, the striker of the invention is positioned within the seat. Further, although a lock pin which engages with the striker, is fixed to the side wall, it is arranged so as not to be seen by persons in the car.

A further object of the invention is to provide a reclining adjuster which can be operated smoothly and comfortably so that the seat may be inclined to its desired angle. To attain this object, the working amount required for operation applied to a knob, should not be varied regardless of the position of the lock pin in relation to the striker. According to the invention, the striker can be rotated upward and rearward.

The striker of the invention is provided horizontally with a number of lock grooves of the same depth, and it is urged so as to engage with the lock pin. The grooves may be formed either upwardly or downwardly.

The lock pin may be so arranged to disengage from the grooves so that the seat back may be folded completely onto the seat cushion. For this purpose, the striker needs to be projected from the side end of the seat back. In this instance, the striker is not seen even if it is projected according to the invention.

The accompanying drawings, which are incorporated in and constitute a part of this specification, illustrate various features of the invention and, together with the description, serve to explain the principles of the invention.

BRIEF DESCRIPTION OF THE DRAWINGS

FIG. 9 is a perspective view of the car seat to which the third embodiment of the invention is applied;

FIG. 10 is an enlarged view of the third embodiment; and

FIG. 11 is a side sectional view of the third embodiment.

DETAILED DESCRIPTION OF THE PREFERRED EMBODIMENTS

Figure 1:
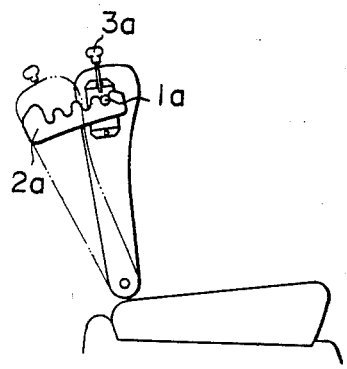
FIG. 1 is a schematic side view of a conventional adjuster.
Figure 2:
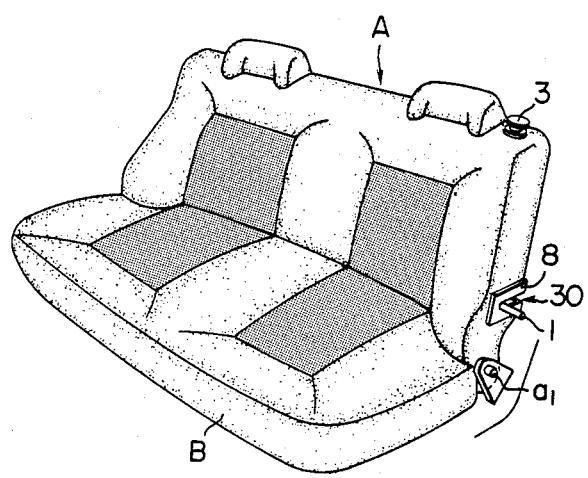
FIG. 2 is a perspective view of a car seat to which the first embodiment of the invention is applied.

Reference will now be made in detail to the present preferred embodiments of the invention, examples of which are illustrated in the FIGS. 2 through 11.

Specifically, FIGS. 2 through 7 show the first embodiment of the invention. Although the seat back (rear seat back) A is provided with the reclining adjuster of the invention, a lock pin 1 fixed to the side wall of the car body B is not seen to the seated person. The seat back A can be turned by means of a pivot pin $a_1$, onto a seat cushion C or car floor.

The striker 2 is narrow enough in width so that it can fit within the seat back A. The lock pin 1 is fixed to the side wall at the position facing the lower position of the seat back (near the upper part of the tire house). Since the adjuster of the invention is positioned near the pivot center (pivot axis) of the seat, the inclining angle of the seat can be adjusted to a wide extent as has been obtained with conventional large size strikers.

The seat back consists of surface cover $a_3$, foam cushion $a_4$, S shaped spring $a_5$ and panel $a_6$.

The striker 2 is a L shaped steel plate, and has a number of lock downward lock grooves 21, 21 of the same depth, at its one horizontal margin. One side of the striker 2 is pivoted to a bracket 6 by means of a pin 7.

The pin 7 is provided with a spring 5. One end of the spring 5 is fixed to the striker 2 in such a manner that the striker 2 is urged to lock or engage with the lock pin 1. The other end of the spring 5 is connected to bracket 6. An operating knob 3 is connected to striker 2 via wire 4.

Figure 7:
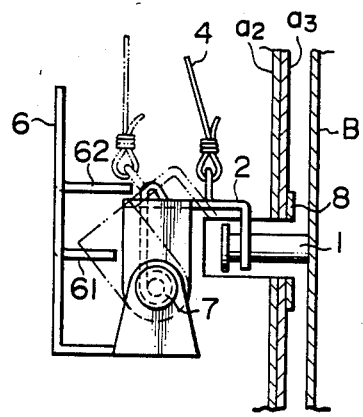
FIG. 7 is a side sectional view.

When the knob 3 is pulled up against the resistance of the spring 5, the striker 2 is rotated resulting in the lock pin 1 being released (see two dotted line of FIG. 7). Excessive rotational movement of the striker 2 is limited by flaps 61, 62 provided to the bracket 6, at the upper or lower position of the striker 2.

The bracket 6 is welded to the seat frame $a_2$. In the drawings, reference numeral 22 represents an inclined guide provided at the rear end of grooves 21, 21, and reference numeral 23 represents a projection provided at the front end so as to prevent the seat A from being excessively inclined.

Figure 3:
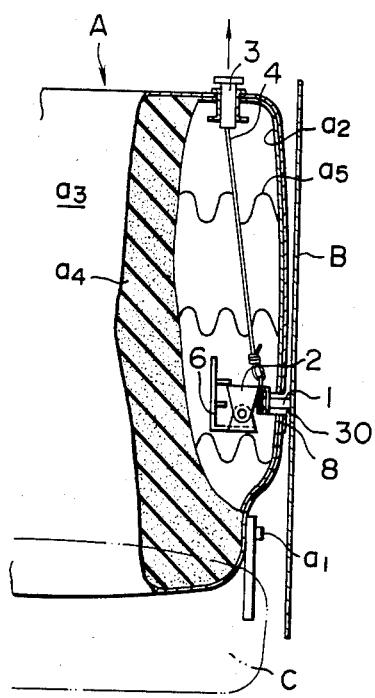
FIG. 3 is a front view of the first embodiment.
Figure 4:
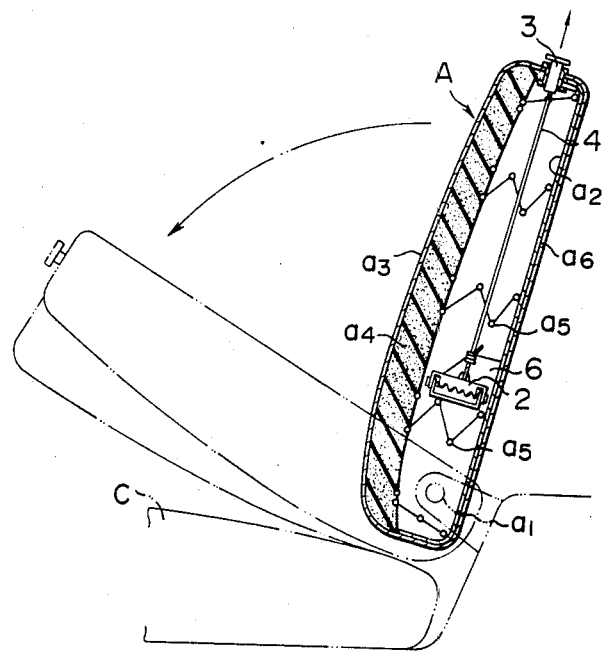
FIG. 4 is a side view of the first embodiment.
Figure 6:
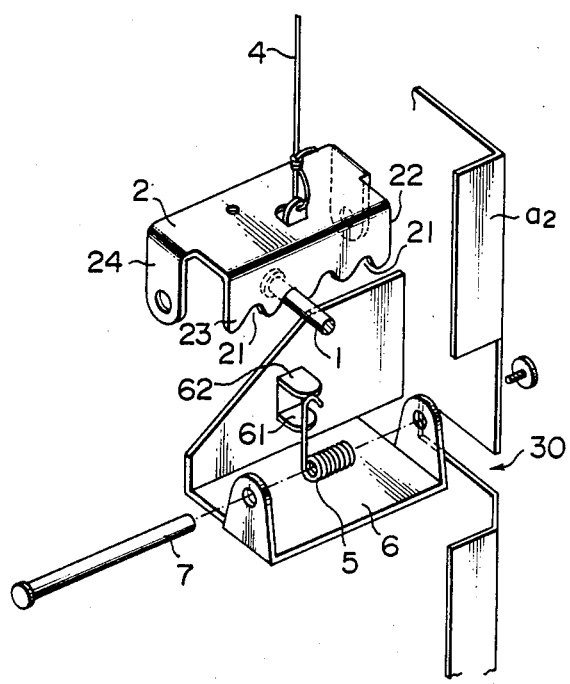
FIG. 6 is an analytical view of the first embodiment.
Figure 5:
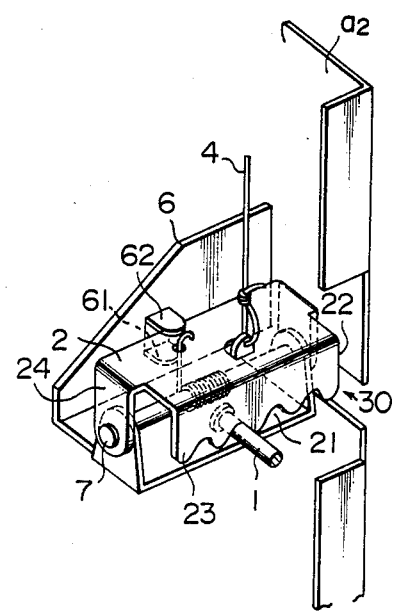
FIG. 5 is an enlarged view of the first embodiment.

When the operating knob 3 provided at the top of the seat A is pulled upward as shown by arrows in FIGS. 3 and 4, the striker 2 is rotated and is released from the condition locking the lock pin 1 (two dotted line in FIG. 7). In this state the seat back is free to be inclined.

Then, after the seat back is inclined to a predetermined angle, the knob is released. The striker rotates back to its original position due to the spring force of the spring 5, and the lock pin 1 comes to be engaged with a predetermined lock groove 21 resulting in the seat A being locked. The knob 3 then returns to its original position.

A cut groove 30 is provided in seat frame $a_2$ and surface cover $a_3$ of the seat back A, at the position of the rear end of the striker 2, so that the lock pin 1 may be slipped off from the groove 30. When the pin comes off from the striker, the seat back can be folded completely forward, as shown in FIG. 4.

When the seat A returns to its locked state, the striker 2 is retained by the flap 62 such that the guide 22 of the striker corresponds to the position of the cut groove 30. Accordingly, the lock pin 1 collides with the guide 22 and pushes up the striker, and thus it is fitted into the groove 21.

Figure 8:
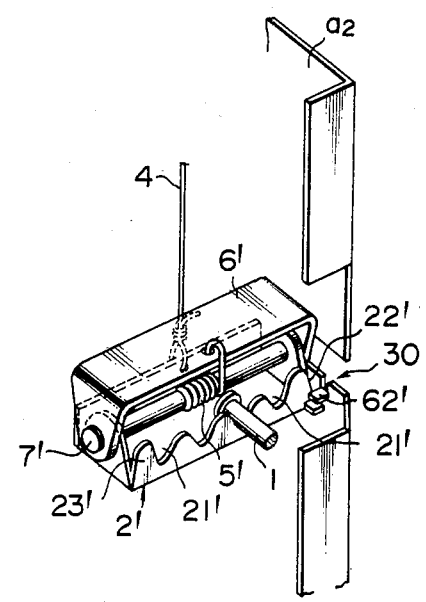
FIG. 8 is an enlarged view of the second embodiment of the invention.

FIG. 8 shows a striker having grooves formed upwardly. In the drawings, a reference numeral 5' represents a spring for urging the striker 2' into contact with the pin, 6' is a bracket, to which the striker 2' is pivoted by a pin 7', 22' is a guide, 23' is a projection for limiting excessive horizontal movement of the striker, and 62' is a flap which also limits excessive rotary movement.

FIGS. 9 through 11 show a structure in which adjuster members are fixed to a casing 10. The casing 10 is projected from the seat side A. Cut grooves 31 are provided therein, so that a lock pin 1 can be moved off from any of the grooves 31. Accordingly, the seat back A can be folded forward or rearward. The casing 10 is rigidly fixed to the seat frame $a_2$ by welding or like technique.

With the use of the projected casing, a simpler structure is realized. Further, the entire structure can be easily fitted to the seat back A. Moreover, since there is no need for providing a cut groove 30, at the side surface of the seat back, the appearance of the seat is improved.

According to the invention, since the striker is positioned at the lower part of the seat, it is not exposed and is invisible and therefore the appearance or beauty in the car will not be spoiled. Further, dresses of the person sitting on the seat will not be caught by the projected striker. Since the striker is positioned near the pivot center of the seat back, even a small sized striker can be used for inclining the seat to a wider extent.

The striker can be rotated upward and downward. Further, the striker is provided horizontally with a number of downward or upward grooves at its end margin, for engagement with a lock pin. With such arrangement, when the operating knob is pulled up for releasing the seat from the locked state, the pulling force is always constant if the lock pin is engaged with any one of the grooves and, accordingly, the pulling up operation is stable and comfortable.

Accordingly, the objects of the invention are achieved.

It will be apparent to those of ordinary skill in the art that various modifications and variations can be made to the above-described embodiments of the invention without departing from the scope of the appended claims and their equivalents.

We claim:

1. A reclining adjuster for a car seat having a seat cushion and a seat back pivotally connected to said seat cushion, said seat back having a side spaced from a side wall of the car, comprising:
    an opening formed in said side of the seat back in the lengthwise direction of the car;
    a lock pin fixed to said side wall of the car and projecting toward said side of said seat back through said opening;
    L-shaped striker means, one leg of which is formed with a plurality of lock grooves said L-shaped striker means located within said seat back and pivotally mounted at a point spaced from said lock grooves,
    spring means for normally biasing said lock grooves into locking engagement with said lock pin to prevent pivotal movement of said seat back; and
    an operation knob connected to said striker means for pivotally moving said striker means, in a direction against the biasing force of said spring means, to release said lock pin from said lock grooves.

2. A reclining adjuster according to claim 1, wherein said striker means is provided with a plurality of engaging grooves extending in the lengthwise direction of the car, and wherein the striker means is pivoted upwardly when the operation knob is pulled up.

3. A reclining adjuster according to claim 1, wherein the seat back is pivoted in such a manner that it can be folded onto the seat cushion.

4. A reclining adjuster according to claim 1, wherein a number of said grooves are all formed with the same depth.

5. A reclining adjuster according to claim 1, further comprising a bracket mounted to the seat back, said bracket including at least one flap for limiting pivotal movement of said striker means.

6. A reclining adjuster according to claim 1, wherein the striker means is mounted in a casing, and a part of the casing projects from the side of the seat back.

* * * * *